United States Patent Office 3,554,956
Patented Jan. 12, 1971

3,554,956
THERMOPLASTIC POLYHYDROXYPOLYAMINE RESIN COMPOSITIONS CONTAINING AN INERT DILUENT AND PROCESS OF MAKING SAME
Faber B. Jones, Bartlesville, Okla., assignor to Phillips Petroleum Company, a corporation of Delaware
No Drawing. Continuation-in-part of application Ser. No. 675,771, Oct. 17, 1967. This application Aug. 4, 1969, Ser. No. 847,394
Int. Cl. C08g 51/44
U.S. Cl. 260—30.2
10 Claims

ABSTRACT OF THE DISCLOSURE

Thermoplastic compositions useful, for example, as hot melt coating materials, are produced by adding, under thermoplastic composition forming conditions, an admixture of a diluent and an epoxy compound having two terminal epoxy groups to an admixture of a diluent and a cyclic or acylic disecondary diamine, the relative portions being such that the ratio of secondary amine groups to epoxy groups in the thermoplastic composition is in the range of 0.9:1 to 1.1:1.

---

This application is a continuation-in-part of my copending application Ser. No. 675,771, filed Oct. 17, 1967, titled Thermoplastic Polyhydroxy-Polyamine Compositions and now abandoned.

This invention relates to a method of producing thermoplastic compositions.

It is well known that thermosetting polymeric compositions can be produced from various epoxy compounds and, specifically, the curing of epoxy compounds with disecondary diamines is well known. The compositions produced, from these thermoseting epoxy compositions, which cannot be reshaped after they have been fully cured, have many applications, such as protective coatings, adhesives, potting compounds, etc.

For many applications, such as in the growing field of hot-melt adhesives where a resin composition is heated to its molten state, applied to the surfaces to be bonded together, and cooled to form the bond, the composition must be thermoplastic, i.e., capable of being softened by heat and then substantially regaining its original properties upon cooling. The production of film, fibers, and other articles by conventional thermal processes such as by extrusion, thermoforming, injection molding, and blow-molding also require a thermoplastic material.

Heretofore, the reaction product of diepoxides and amines was considered by the prior art to be a curable composition which cured into a thermosetting resin. For instance, U.S. 2,932,626, Phillips et al. (1960) discloses that when polyfunctional amines are reacted with diepoxy compounds a composition which cures into a tough, infusible resin, is produced. I have found, quite surprisingly and contrary to the teachings of the patent, and the entire prior art, that diepoxides can be reacted with disecondary diamines to form compositions which are in fact thermoplastic, instead of thermosetting as suggested by the prior art.

Two of the most significant features of my method of producing thermoplastic polyepoxypolyamines, which are not disclosed or appreciated by the prior art, are the use of a suitable diluent and the sequence of combining the epoxy and diamine. Thus, broadly this invention comprises adding, under thermoplastic composition producing conditions, which in one embodiment includes a temperature in the range of 50-250° C., an admixture of a diluent and a diepoxy compound to an admixture of a diluent and a cyclic or acyclic disecondary diamine. In addition, the thermoplastic compositions produced by my invention have a stoichiometric ratio such that the number of amine per epoxy groups is in the range of 0.9 to 1.1.

Accordingly, an object of this invention is to provide a method for producing thermoplastic compositions.

A further object of this invention is to provide thermoplasitc compositions capable of use as hot-melt adhesives.

Other objects, aspects and advantages of this invention will become readily apparent to those skilled in the art from the following disclosure and appended claims.

The diepoxides which may be employed in this invention are those epoxy compounds having two terminal epoxy groups, i.e., two

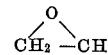

groups, per molecule. The diepoxides which can be used are broadly characterized by the structural formula:

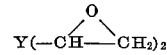

where Y is a divalent hydrocarbon radical which is aliphatic, cycloaliphatic, aromatic, combinations thereof, or a substituted hydrocarbon radical in which the substituent comprises oxygen in ether linkages or hydroxyl groups, sulfur in thioether linkages or thiol groups, nitrogen with all valences attached to carbon atoms, and chlorine, bromine or fluorine atoms. It is obvious that groups which are known to readily react with the epoxy groups of the diepoxide or the amino groups of the disecondary diamines are meant to be excluded to preclude the formation of a three-dimensional, nonthermoplastic structure.

Two general classes of diepoxides within this broad classification are particularly preferred for use with this invention: (1) diglycidyl ethers of dihydric phenols and (2) diglycidyl esters of dicarboxylic acids. The diepoxides in class (1) are widely known and are commercially available. A compound sould under the Trademark "Epon 828" is a specific example of such a commercially available diepoxide. This compound is typified by the formula:

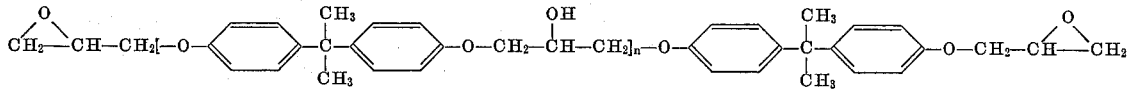

where n=0 to 8.

Any of many well known techniques can be utilized to prepare the diepoxides within this general class. For example, diepoxides within class (1) can be prepared by reacting 2,2-bis(4-hydroxyphenyl)propane with an excess of epichlorohydrin in alkaline solution with varying mol ratios of epichlorohydrin to dihydric phenol.

Examples of dihydric phenols that can be reacted with epichlorohydrin in alkaline solution to yield the diglycidyl ethers are mononuclear phenols, such as resorcinal, catechol, hydroquinone, etc., or polynuclear phenols such as 2,2-bis(4-hydroxyphenyl)propane (bis phenol A), 1,1-bis(4-hydroxyphenyl)ethane, 2,2-bis(4 - hydroxyphenyl) butane, 2,2-bis(4-hydroxy-2-methylphenyl)propane, 2,2-bis(4 - hydroxy-2-tertiarybutylphenyl)propane, bis(2-hydroxynaphthyl)methane, 1,5-dihydroxynaphthalene, etc.

The product mixture can be represented by the following formula:

(I)

where R is a divalent hydrocarbon radical of a dihydric phenol and $n$ is 0 or an integer of such value that the compound falls within the general limits of the general structural formula above, i.e.,

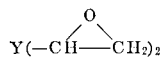

The value of $n$ can be varied from 0 upwardly by changing the molecular proportion of epichlorohydrin and dihydric phenol, as is known to the art. A preparation of exemplary epoxy compounds of class (1) is disclosed in U.S. Pat. 2,615,008.

Representative examples of the diepoxides of class (1) include 2,2-bis[p - (2,3 - epoxypropoxy)phenyl]propane, 1,2-bis[p-(2,3-epoxypropoxy)phenyl]ethane, 1,4 - bis(2,3-epoxypropoxy)benzene, and the like.

The diglycidyl esters of dicarboxylic acids of class (2) can be prepared by any of the known processes. One method, as disclosed in U.S. Pat. 3,053,855, Maerker et al. (1962), involves heating a reaction mixture of a 1 to 20 molar excess of epichlorohydrin and an aqueous solution of an alkali metal salt of the organodicarboxylic acid, particularly the potassium or sodium salt of a dicarboxylic acid, in the presence of a quaternary ammonium halide until substantially all the salt has reacted, and separating the diglycidyl esters from the reaction mixture. Other methods are disclosed in U.S. Pat. 2,901,505, Kolb (1959), and British Pat. 735,001, Henkel and Cie (1953).

The diepoxides of class (2) can be represented by the following formula:

(II)

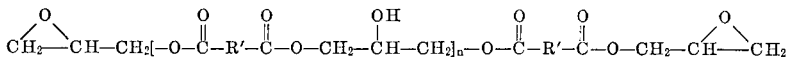

where $n$ is the same as in Formula I and R' is a divalent hydrocarbon radical containing in the range of about 2 to 20 carbon atoms. Representative examples of the diepoxides of class (2) include diglycidyl isophthalate, diglycidyl terephthalate, diglycidyl-1,2-ethanedicarboxylate, diglycidyl-1,20-eicosanedicarboxylate, diglycidyl-1,6-cyclododecanedicarboxylate, and the like.

The disecondary diamines which are useful to produce the thermoplastic composition of this invention are either cyclic or acyclic depending upon whether they contain 2 or 3 organic moieties, i.e., if 2 organic moieties are present the diamine is cyclic, if 3 organic moieties are present the diamine is acyclic. As used herein, cyclic disecondary diamines are those amines represented by the formula:

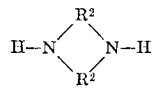

where each $R_2$ moiety is an alkylene radical having 1 through 8 carbon atoms, preferably 2 through 4 carbon atoms. Representative examples of cyclic disecondary diamines which can be used include piperazine, 2,5-dimethylpiperazine, 2,5-diethylpiperazine, and the like.

As used herein, acyclic disecondary diamines are those amines represented by the formula:

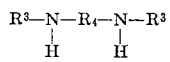

where each $R^3$ moiety is a monovalent hydrocarbon radical having 1 through 20 carbon atoms per molecule, a substituted hydrocarbon radical in which the substituent is selected from the group consisting of oxygen in ether linkages, sulfur in thioether linkages, nitrogen with all valences attached to carbon atoms, chlorine, fluorine, or bromine atoms, and combinations thereof, said monovalent hydrocarbon radical preferably being alkyl, cycloalkyl, aryl or combinations thereof, such as alkaryl, aralkyl and the like, having 1 through 8 carbon atoms per molecule; and $R^4$ is the same as $R^3$ except is divalent instead of being monovalent and has one less hydrogen atom, said divalent hydrocarbon radical preferably being alkylene, arylene, cycloalkylene, or combinations thereof, such as alkarylene, alkaralkylene and the like.

Preferably, the acyclic disecondary diamines contain a total of about 4 to 25 carbon atoms per molecule.

Representative examples of acyclic disecondary diamines which can be used include N,N'-dimethylmethanediamine,
N,N'-dimethyl-1,6-hexanediamine,
N,N'-dieicosyl-1,20-eicosanediamine,
N,N'-di(ethoxypropyl)-1,4-cyclohexanediamine,
N-methyl-N'-(4-chloro-6-bromo-7-methyldecyl)-1,4-benzenediamine,
N,N'-diethyl-3,3-difluoro-1,6-hexanediamine,
N,N'-diisopropyl-1,4-naphthalenediamine,
N,N'-di(propoxybutyl)-3,3'-biphenyldiamine,
N,N'-di(4-chlorobutyl)benzidine,
N,N'-di(4-tetrahydropyranyl)-1,5-pentanediamine,
N,N'-di(4-tetrahydropyranyl)-1,5-cyclodecanediamine,
N,N'-di(3-bromo-4-methoxyphenyl)-2,6-naphthalenediamine,
N,N'-di(methylthiopropyl)-1,3-cyclohexanediamine,
and the like.

These disecondary diamines can be synthesized by any of the well known methods.

The diluent useful with this invention can comprise any diluent that is inert with respect to the reactants under thermoplastic composition producing conditions. Examples of suitable diluents include dimethylformamide, dimethylacetamide, N-methylpyrrolidone, sulfolane, naphthalene, toluene, xylene, anisole, 4-phenyltetrahydropyran, diethyl-p-toluamide, and the like.

The thermoplastic composition producing conditions of this invention can comprise any conditions that will result in the formation of a thermoplastic composition in accordance with the practice of this invention. The temperature of the thermoplastic composition forming conditions can, in one embodiment, be in the range of 50–250° C. The pressure of the thermoplastic composition producing conditions can be atmospheric, superatmospheric or subatmospheric. In one embodiment, a blanket of inert gas, such as nitrogen, helium or the like, can be maintained in the reactor during the addition of the diluent-epoxy admixture to the diluent-amine admixture. The epoxy-diluent admixture can be added to the amine-diluent admixture by any method which effects an intimate mixing thereof, such as in stirred reactors, ribbon blenders, shakers, tumblers, and the like.

According to the practice of this invention, the disecondary diamines and diepoxides are combined in relative portions so that the ratio of amine to epoxy groups in the thermoplastic composition is in the range of 0.9:1 to 1.1:1, a ratio of 1 to 1 being preferred. Mixtures of two or more disecondary diamines and diepoxides can be used of desired.

As will be evident to those skilled in the art, various modifications and alterations can be made to this invention in view of the foregoing discussion without departing from the spirit or scope thereof.

The following examples are presented to further clarify and illustrate the objects and advantages of this invention and are in no way intended to be construed as limiting the invention thereto.

EXAMPLE I

A control run was conducted to demonstrate the thermosetting composition produced when the instant invention is not practiced.

In this run 17.63 grams of piperazine and 74.80 grams of 2,2 - bis[p - (2,3 - epoxypropoxy)phenyl]propane were charged to a reactor. The reaction mixture became a gel after 40 minutes at 100° C. The product was recovered and heated to 350° C. and no melting was observed, thus a thermosetting composition had been produced.

EXAMPLE II

Another run was conducted to demonstrate the production of thermoplastic compositions according to the practice of this invention.

In this run 28.66 grams of piperazine, a cyclic disecondary diamine, and 50 milliliters of N-methylpyrrolidone diluent were added to a stirred reactor under a nitrogen blanket. This mixture was heated to 100–110° C. while being stirred and 123.6 grams of bis(glycidyl ether) of bis phenol A, i.e., 2,2-bis[p-(2,3-epoxypropoxy)phenyl]propane, containing a small amount of oligomers in 250 grams of N-methylpyrrolidone diluent was added over a one-hour period and a reaction mixture, which was a light golden brown, slightly viscous solution, was produced. The crude polymer was cooled to room temperature whereupon the polymer thickened but no precipitation occurred. The polymer was then isolated by pouring into cold water with rapid agitation. The solid thus obtained was macerated with fresh water in a blender, filtered, and vacuum-dried at 100° C. for 24 hours. This product was an extremely tough, light brown solid having an inherent viscosity of 1.05 in m-cresol at 30° C. as determined in an Ostwald-Fenske-Cannon viscosimeter. The produced polymer was determined to be thermoplastic with a softening point of 190°–195° C.

Thus, applicant has demonstrated that thermoplastic compositions can be produced according to the practice of this invention.

EXAMPLE III

An investigation of the adhesive properties of the thermoplastic composition of Example II was conducted.

Coupons of 2024T alloy aluminum 1 in. by 4 in. by 0.065 in. were vapor degreased in trichloroethylene and then submerged in a solution of 500 grams water/150 grams concentrated $H_2SO_4$/50 grams sodium dichromate at 70° C. for 15 minutes. Following the acid pickle the coupons were washed three times in distilled water and oven-dried one hour at 70°–80° C.

The thermoplastic composition of Example II was pressed into a thin film approximately 3 to 4 mils thick. The composition was then used as a hot-melt adhesive by bonding the treated coupons and the polymer film together at about 225° C. with ½-inch overland and a force sufficient to press the two surfaces of the overlapped coupons firmly together (approximately 10 p.s.i.). After 15 minutes, the bonded coupons were cooled, trimmed with a high speed hand grinder to remove any flash from the bond edges and allowed to stand for a minimum of 24 hours at room temperature.

Lap shear strength of the bonded coupons was measured at various temperatures with an Instron Model TT 10,000 lb. tester in accordance with ASTM D1002–53T. At room temperature the measured bond strength was 1970 p.s.i., at 65° C. the bond strength was 1958 p.s.i., and at 105° C. the bond strength was 400 p.s.i.

From these data it can be seen that the thermoplastic compositions of this invention exhibit good bonding strength when used as a hot-melt adhesive.

EXAMPLE IV

A composition prepared in accordance with the procedure of Example II was heated repeatedly to temperature substantially above its softening point, approximately 220° to 225° C., and was maintained at these temperatures for 2 to 4 hours. The composition was then used to bond aluminum coupons as in Example III and the bonded coupons were subjected to lap shear tests which gave results that were substantially the same as in Example III.

From these data it can be seen that the composition was indeed thermoplastic since it substantially retained its original properties even though it had been repeatedly heated to its softening point.

EXAMPLE V

A composition was prepared under the same conditions as in Example II except N,N'-dimethyl-1,6-hexanediamine, an acyclic disecondary diamine, was used in place of piperazine. The composition produced was thermoplastic having a melting point between 60° and 70° C. The composition was heated repeatedly above its softening point and in each instance it regained its original properties upon cooling.

EXAMPLE VI

A composition was prepared in accordance with the procedure of Example V except that toluene was substituted for the N-methylpyrrolidone diluent. The resulting polymer was determined to be thermoplastic and a melting point between 60–70° C. was observed.

I claim:

1. A method for producing a thermoplastic polyhydroxypolyamine composition comprising heating to a temperature of not more than 250° C. a mixture comprising an admixture consisting essentially of an inert diluent selected from the class consisting of dimethylformamide, dimethylacetamide, N-methylpyrrolidone, sulfolane, naphthalene, toluene, xylene, anisole 4-phenyltetrahydropyran, or diethyl-p-toluamide and at least one epoxy compound having terminal 1,2-epoxy groups and selected from the class consisting of diglycidyl ethers of dihydric phenols and diglycidyl esters of dicarboxylic acids with an admixture consisting essentially of an inert diluent selected from the class consisting of dimethylformamide, dimethylacetamide, N-methylpyrrolidone, sulfolane, naphthalene, toluene, xylene, anisole, 4-phenyltetrahydropyran or diethyl-p-toluamide and at least one disecondary diamine having the formula

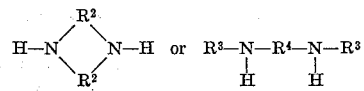

wherein $R^2$ is an alkylene radical having 1 to 8 carbon atoms; $R^3$ is a hydrocarbon radical selected from the class consisting of alkyl, cycloalkyl, aryl, alkoxyalkyl, haloalkyl, alkylthioalkyl, and haloalkyoxyaryl radicals having up to 20 carbon atoms or tetrahydropyranyl; and $R^4$ is a divalent hydrocarbon radical selected from the class consisting of alkylene, cycloalkylene or arylene radicals having up to 20 carbon atoms; the amount of said epoxy compound and said disecondary diamine being such that the number of secondary amine groups per terminal epoxy group in said thermoplastic composition is in the range of 0.9–1.1:1.

2. The method according to claim 1 wherein said epoxy compound comprises a diglycidyl ether of a dihydric phenol.

3. The method according to claim 2 wherein said diglycidyl ether of a dihydric phenol is 2,2-bis[p-(2,3-epoxypropoxy)phenyl]propane.

4. The method according to claim 1 wherein said epoxy compound comprises a diglycidyl ester of a dicarboxylic acid.

5. The method of claim 1 wherein said diamine is piperazine.

6. The method of claim 1 wherein said diamine is N,N'-dimethyl-1,6-hexanediamine.

7. The method of claim 1 wherein said diluent comprises N-methylpyrrolidone.

8. The method of claim 1 wherein said diluent comprises toluene.

9. The method of claim 1 wherein said temperature is in the range of 50–250° C.

10. Thermoplastic polyhydroxypolyamine resin compositions comprising the reaction product of:
(a) at least one epoxide compound having terminal 1,2-epoxy groups selected from the class consisting of diglycidyl ethers of dihydric phenols and diglycidyl esters of dicarboxylic acids in admixture with an inert diluent selected from the class consisting of dimethylformamide, dimethylacetamide, N-methylpyrrolidone, sulfolane, naphthalene, toluene, xylene, anisole, 4-phenyltetrahydropyran, or diethyl-p-toluamide; and
(b) at least one disecondary diamine having the formula

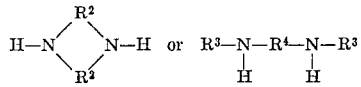

wherein $R^2$ is an alkylene radical of 1 to 8 carbon atoms; $R^3$ is a monovalent hydrocarbon radical selected from the class consisting of alkyl, cycloalkyl, aryl, alkoxyalkyl, haloalkyl, alkylthioalkyl, haloalkoxyaryl radicals having up to 20 carbon atoms or tetrahydropyranyl; and $R^4$ is a divalent hydrocarbon radical selected from the class consisting of alkylene, cycloalkylene and arylene having up to 20 carbon atoms; in admixture with an inert diluent selected from the class consisting of dimethylformamide, dimethylacetamide, N-methylpyrrolidone, sulfolane, naphthalene, toluene, xylene, anisole, 4-phenyltetrahydropyran, or diethyl-p-toluamide; wherein the amount of said disecondary diamine and epoxy compound is such that the number of secondary amine groups per terminal epoxy group is in the range of 0.9–1.1:1.

References Cited
UNITED STATES PATENTS
| | | | |
|---|---|---|---|
| 2,642,412 | 6/1953 | Newey et al. | 260—47Ep |
| 2,935,488 | 5/1960 | Phillips et al. | 260—47Ep |

FOREIGN PATENTS
| | | | |
|---|---|---|---|
| 868,733 | 5/1961 | Great Britain | 260—47Ep |

WILLIAM H. SHORT, Primary Examiner

T. E. PERTILLA, Assistant Examiner

U.S. Cl. X.R.

117—161; 260—30.4, 30.8, 32.6, 33.2, 33.6, 47